United States Patent [19]
Leskinen

[11] Patent Number: 5,573,183
[45] Date of Patent: Nov. 12, 1996

[54] METHOD AND APPARATUS FOR HEATING BUILDING AND VENTILATION AIR

[75] Inventor: Seppo Leskinen, Västerskog, Finland

[73] Assignee: ABB Flakt AB, Stockholm, Sweden

[21] Appl. No.: 295,849

[22] PCT Filed: Mar. 10, 1993

[86] PCT No.: PCT/FI93/00085

§ 371 Date: Sep. 7, 1994

§ 102(e) Date: Sep. 7, 1994

[87] PCT Pub. No.: WO93/18350

PCT Pub. Date: Sep. 16, 1993

[30] Foreign Application Priority Data

Mar. 10, 1992 [FI] Finland ................................. 921034

[51] Int. Cl.⁶ ............................................................ F24D 3/02
[52] U.S. Cl. ............................................ 237/8 R; 237/19
[58] Field of Search ....................................... 237/8 R, 19

[56] References Cited

U.S. PATENT DOCUMENTS

| | | | |
|---|---|---|---|
| 3,890,787 | 6/1975 | Margen | 60/648 |
| 4,232,657 | 11/1980 | Killorin | 237/8 R X |
| 4,347,972 | 9/1982 | Hillerstrom et al. | 237/19 X |
| 4,671,459 | 6/1987 | Stapensea | 237/19 X |
| 5,226,594 | 7/1993 | Swenson | 237/19 X |
| 5,347,825 | 9/1994 | Krist | 237/8 R X |

FOREIGN PATENT DOCUMENTS

| | | | |
|---|---|---|---|
| 312879A | 9/1973 | Germany | F24D 12/00 |
| 100674A1 | 8/1992 | Germany | F24D 3/08 |
| 157037C | 11/1957 | Sweden | F24D 9/00 |
| 012210A | 12/1992 | Sweden | F24D 9/00 |
| 749574 | 5/1956 | United Kingdom | F24D 12/00 |

*Primary Examiner*—William E. Tapolcai
*Attorney, Agent, or Firm*—Fitch, Even, Tabin & Flannery

[57] ABSTRACT

A method and apparatus for heating room space of a building. According to the invention, heat is conveyed from district heating water to a heating liquid of heating circuits for heating the building, tap water and supply air of ventilation. According to the invention, the heating circuits for heating the building and the supply air are connected in series in such a manner that the heating liquid flowing in the piping heats, after passing a heat exchanger, first the heating circuit for heating the building and thereafter the heating circuit for heating the supply air. On account of the invention, the temperature of the district heating return water is lower than in the known apparatuses.

17 Claims, 3 Drawing Sheets

METHOD AND APPARATUS FOR HEATING BUILDING AND VENTILATION AIR

BACKGROUND OF THE INVENTION

This invention relates to a method for heating room space of a building, comprising conveyance of heat from a district heating liquid to a heating liquid of heating circuits for heating the building and the ventilation air or the like. The invention also relates to an apparatus for heating room space of a building.

In district heating plants and boiler plants, the temperature of supply water conducted from the plant is usually 90° . . . 110° C., depending on the plant. The water required for the heating, ventilation and tap water of buildings is generally heated in a heat exchanger, the temperature of the water supplied therefrom to the building being normally 70° . . . 90° C. In a peak load situation, according to which heating networks are usually designed, the temperature of return water conducted from the building cannot normally be dropped below 40° C. The temperature of the district heating return water is thus approximately 50° C. when minimum costs are to be achieved. In view of the investment costs, pumpage rates, heat losses, etc., of district heating networks, it would be advantageous to drop the temperature of the return water even more, but the costs of heat exchangers would increase rapidly even with a small additional drop, as the temperature difference even in the present apparatuses is rather small, about 10° C.

In conventional buildings, the proportion of ventilation in the heating energy consumption of the building is approximately 35 . . . 50%, depending on the type of building and the systems utilized in it. Both the heat losses of the building and the heat requirement of ventilation are directly proportional to the difference between indoor and outdoor temperature, i.e. the ratio between them is approximately constant. The overall heat balance encompasses, in addition, the internal heat evolution of the building (lighting, electric appliances, people, etc.) and hot tap water, which are both independent of outdoor temperature and have opposite effects. The proportion of ventilation varies thus very little with changes in the outdoor temperature.

SUMMARY OF THE INVENTION

The object of the present invention is to provide a method by means of which the temperature of district heating return water can be dropped more than in known apparatuses without significant extra investments. The method of the invention is characterized in that one of said liquids is arranged to flow in such a manner that it conveys heat first to the heating of the building and thereafter to the heating of the ventilation air.

The basic idea of the invention is to connect the heat supplies for heating and ventilation in series in such a manner that in the first step the heat requirement of heating is met at a higher energy level, and in the second step the heat requirement of ventilation is met at a lower energy level. This can be achieved either by circulating the heating water of a building first through the heating system of the building and then through heat exchangers of the ventilation system, or by circulating the district heating water first through the heating system and then through the heat exchanger of the ventilation system.

The advantages of the invention are particularly obvious when heat is conveyed from exhaust air of a building to supply air by means of a heat recovery circuit.

In the first step, the circulating water can be cooled down to about 40° C. and the district heating return water to about 50° C., as stated above. In the second step, the heating water of the system can be cooled even below 0° C. according to the invention, with the result that the temperature of the district heating return water can be dropped to 20° . . . 30° C. Thus, the capacity of the district heating network can be increased by about 50%, or the investments can be reduced by about 35%. The pumpage rate can be reduced by about 30 . . . 35%, and the heat losses of the return water can be reduced to below half of the losses in the present systems. Furthermore, the network will be controlled more easily with small loads.

A further object of the invention is to provide an apparatus for heating room space of a building, comprising heat exchanging means for conveying heat from a district heating liquid to a heating liquid flowing in heating circuits for heating the building and the ventilation air or the like.

The apparatus of the invention is characterized in that the heating circuits for heating the building and the ventilation air are connected in series, and that one of said liquids is arranged to flow in the apparatus in such a manner that it conveys heat first to the heating of the building and thereafter, when it is colder, to the heating of the ventilation air.

BRIEF DESCRIPTION OF THE DRAWINGS

In the following, the invention will be described in greater detail with reference to the attached drawings, wherein.

DESCRIPTION

Figure 1:
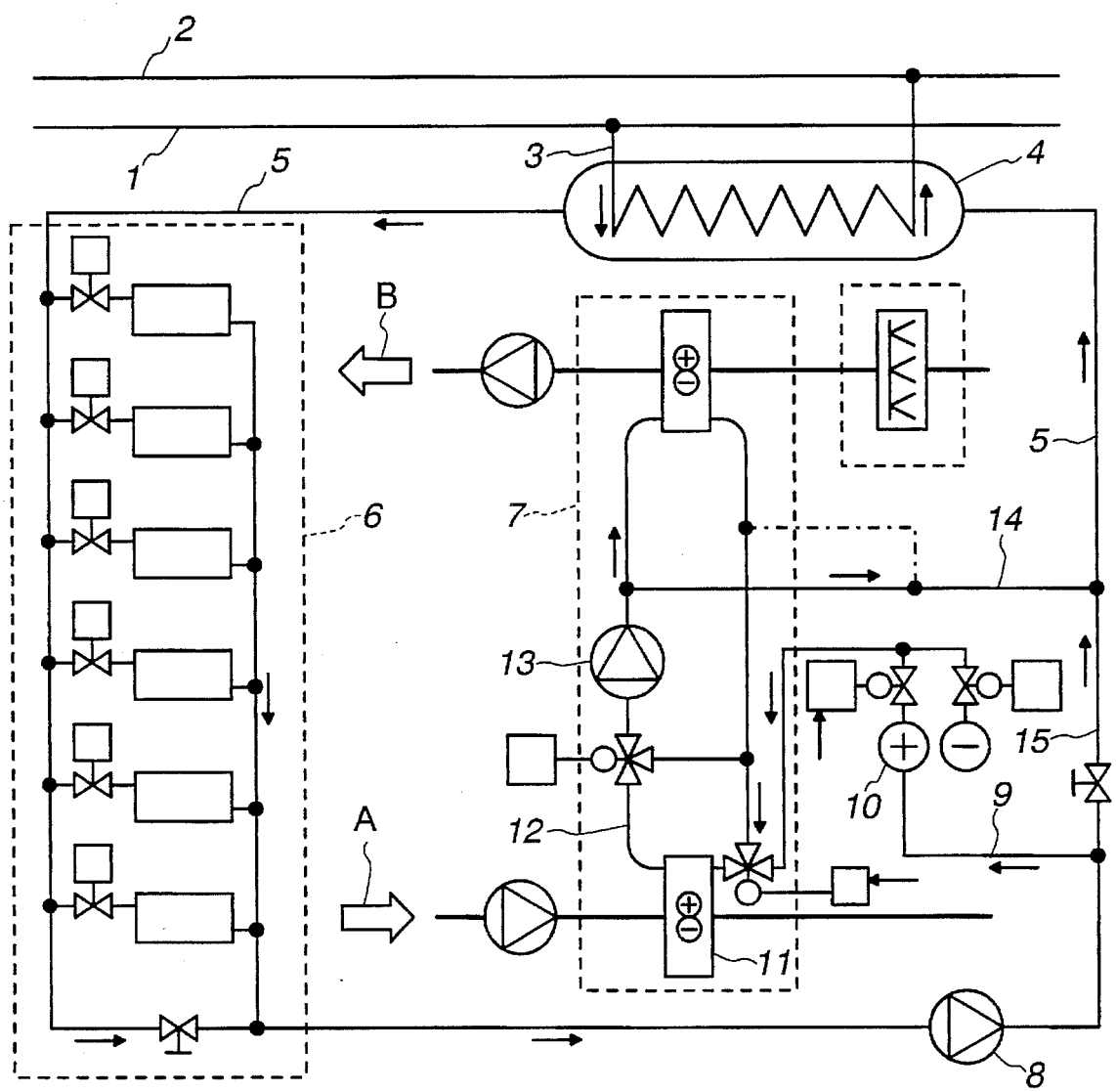
FIG. 1 shows a first embodiment of the apparatus of the invention as a simplified functional diagram.

In FIG. 1, the supply main of the district heating network is indicated by the reference number 1 and the return main by the reference number 2. The mains are connected by a conduit 3 to the primary circuit of a heat exchanger 4. Piping 5 is connected to the secondary circuit of the heat exchanger 4 for circulating heating water for heating the room space of a building. FIG. 1 shows two heating circuits, indicated by dashed line, i.e. a heating circuit 6 for heating the building, and a heating circuit 7 for heating the ventilation air. The heating circuit 6 comprises devices for heating the building, such as radiators, a tap water heater and the like. The heating circuit 7 corresponds essentially to the heat exchanger disclosed in Finnish Patent Application No. 915,511, by means of which heat is conveyed from exhaust air B, exhausted from a building, to supply air A, supplied into the building. With respect to the operation of the heat exchanger, we refer to the above-mentioned patent application.

The circulation piping comprises a pump 8, by means of which heating water is conducted to a supply water pipe 9 of the heating circuit 7, said pipe being connected to a heating source 10 of the heating circuit 7 and further to a heat exchanger 11 of the supply air A in the heat recovery circuit. After the heat exchanger 11, the circulation pipe 12 of the heat recovery circuit in the heating circuit 7 is provided with a circulation pump 13 on the cold side, after which a return pipe 14 is connected to the circulation piping, said return pipe being connected at one end thereof to the circulation piping 5. Owing to the different liquid flows of the heating circuits 6 and 7, the apparatus is provided with a bypass conduit 15. The circulation pipe 5 is connected to the second circuit of the heat exchanger 4.

According to the invention, the heating circuits 6, 7 are connected in series in such a manner that they have common circulation piping 5, wherein the heating water flows first through the heating circuit 6 for heating the building and thereafter through the heating circuit 7 for heating the ventilation air. The apparatus of the invention operates in the following manner.

The water in the district heating supply main 1, the temperature of the water being usually approximately 90° . . . 110° C., flows through a conduit 3 to the primary circuit of a heat exchanger 4 and therefrom to the district heating return main 2. The heating water circulating in circulation piping 5 is heated in the secondary circuit of the heat exchanger to a temperature of 70° . . . 90° C. and flows from the heat exchanger to a heating circuit 6 for heating the building and hot tap water, and further through a pump 8 and a pipe 9 to a heat exchanger 11 of a heat recovery circuit, in which heating circuit 6 the cooled water conveys heat further to supply air A. If we assume that the temperature of the supply air is −25° C., the temperature of the heating water in circulation piping 12 on the cold side of the heat recovery circuit drops to about −15° C. This requires naturally that a non-freezing heating liquid, for example a mixture of water and glycol, be utilized in the entire system. If the heating water is below 0° C. in the secondary circuit of the heat exchanger 4, the temperature of the district heating return water falls to about 20° . . . 30° C., whereby the advantages described above are achieved.

In view of the balance of the heat recovery circuit, it may be advantageous in some cases to connect the return pipe 14 to the hot side of the heat recovery circuit, i.e. after the exhaust air heat exchanger in the flow direction of the liquid, wherein the temperature of the heating liquid is e.g. about 20° C. Thereby the district heating return water is cooled down to about 30° C. This alternative is indicated by a line of dots and dashes in FIGS. 1 and 2.

Figure 2:
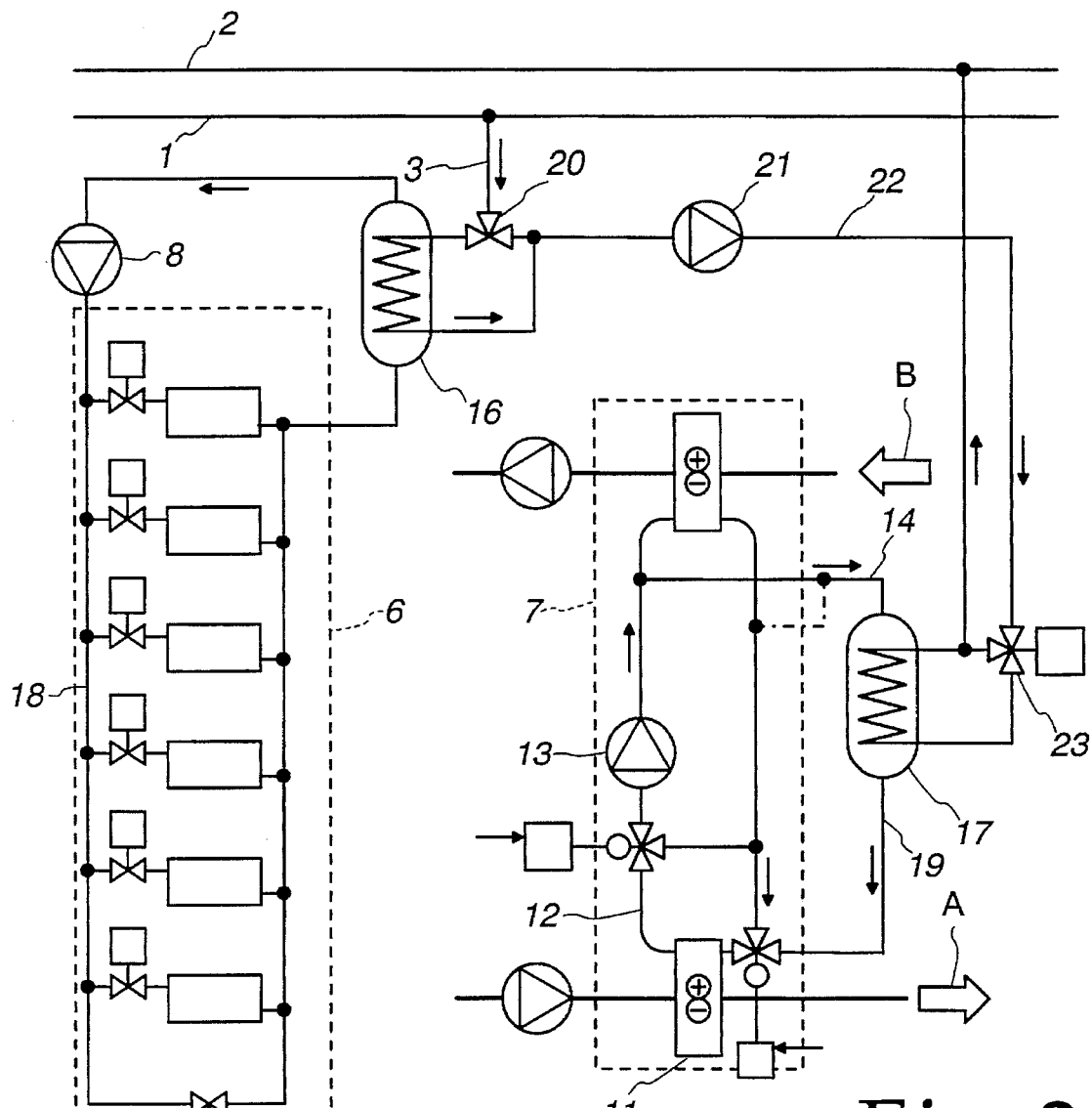
FIG. 2 shows a second embodiment of the apparatus in a manner corresponding to FIG. 1.

FIG. 2 shows a second embodiment of the apparatus of the invention, wherein the heat exchanger 4 according to FIG. 1 is replaced by two heat exchangers 16 and 17 for heating circuits 6 and 7 respectively. Each of the heating circuits has separate circulation piping 18 and 19 respectively. The heat exchangers 16, 17 are connected in series in such a manner that a conduit 3 conducts the district heating water from the supply main 1 first to the heat exchanger 16 and subsequently to the heat exchanger 17, from which the water flows to the return main 2 of the district heating network.

In this embodiment, the water from the district heating network flows through a regulating valve 20 to the heat exchanger 16 of the heating circuit 6, in which heat exchanger it is cooled to about 50° C., and further by means of a pump 21 through a conduit 22 and a regulating valve 23 to the heat exchanger 17 of the heating circuit 7, in which heat exchanger the district heating water is further cooled to about 20° . . . 30° C., and is conducted to the return main 2 of the district heating network.

The advantage of this embodiment is that the entire heating circuit 6 can be a water system, and merely the liquid flowing in circulation piping and the secondary circuit of the heat exchanger 17 must be non-freezing, for example a water-glycol liquid. Water does not set the same special requirements for the components as a mixture of water and glycol, wherefore the apparatus according to FIG. 2 is less expensive than the one according to FIG. 1. The separate heating circuits 6, 7 can also be controlled more easily than in the embodiment according to FIG. 1, wherein the circuits have a common circulation pipe 5.

Figure 3:
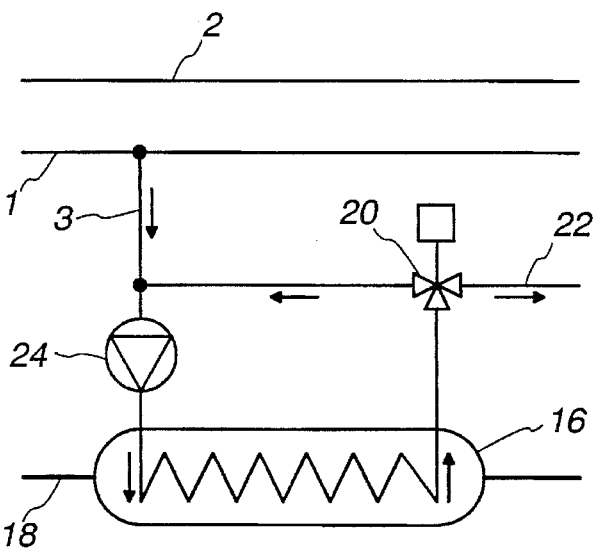
FIG. 3 shows a modification of the embodiment according to FIG. 2.

FIG. 3 shows an embodiment wherein each of the heat exchangers 16, 17 is provided with a separate circulation water pump 24, with the result that the use of the district heating water can be minimized and/or the apparatus can be controlled more easily.

Figure 4:
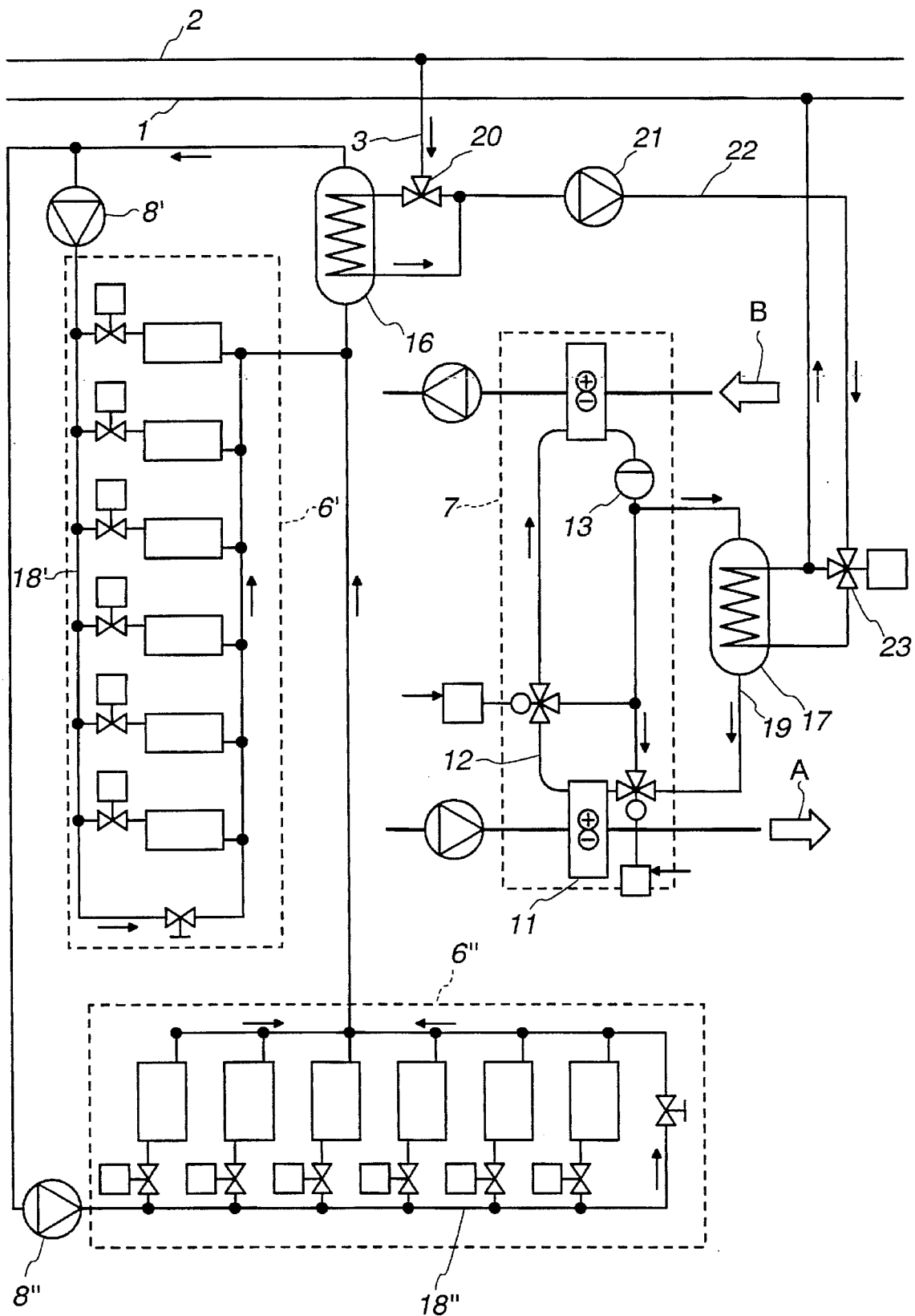
FIG. 4 shows a third embodiment of the apparatus of the invention.

FIG. 4 shows how the heating circuit 6 can be divided into two subcircuits 6' and 6". In the embodiment disclosed, the circuits are connected in parallel and have a common heat exchanger 16. Alternatively, each subcircuit 6' and 6" can have a separate heat exchanger, and the subcircuits may be connected in series, which is advantageous, especially if one of the circuits produces hot tap water. There may also be more than two subcircuits.

The heat exchanger of hot tap water can be connected in series with the heating system in parallel with the heat exchanger of ventilation if there is a simultaneous need for heating, ventilation and tap water.

The use of hot tap water is usually periodic, and hot tap water is needed even in summer when the building and its ventilation do not require heating. According to the invention, the temperature of the return water in the heating system can usually be dropped sufficiently by means of ventilation. Therefore it is generally useful to build a separate circuit for the production of hot tap water, which circuit is connected directly to the district heating network and can be designed for a low temperature of the return water.

In the above, merely embodiments which do not restrict the scope of the invention have been described. The functional diagrams in the drawings have been simplified on purpose by omitting parts and operations that are not necessary in order for the basic idea of the invention to be understood. The heating circuit 7 can also be divided in a manner corresponding to the heating circuit 6 in FIG. 4, whereby thermic operations, such as heating of air, waste heat recovery and heat recovery from exhaust air, can be arranged in different subcircuits, if desired. The district heating water or liquid refers here to hot liquid produced even in other corresponding plants, such as boiler plant of a building.

I claim:

1. A method for heating room space of a building, comprising conveyance of heat from a district heating liquid to a heating liquid of heating circuits for heating the building and ventilation air, wherein, in order to obtain low temperature of the district heating liquid after said conveyance, said heating liquid flowing in the heating circuits is arranged to flow in such a manner that it conveys heat needed for the heating of the building and thereafter heat needed for the ventilation air.

2. A method according to claim 1, comprising conveyance of heat from exhaust air of the building to supply air by means of a heat recovery circuit, wherein the heating liquid heating the ventilation air is arranged to flow through a heat exchanger in said heat recovery circuit, in which heat exchanger the liquid conveys heat to the supply air.

3. A method according to claim 2, wherein the heating liquid is removed from the heat recovery circuit prior to the heat exchanger of exhaust air or after it has passed through the heat exchanger of the exhaust air.

4. A method according to claim 1, wherein said flowing liquid is the heating liquid of the heating circuit which is circulated from the heat exchanger through the heating circuit for heating the building and thereafter through the heating circuit for heating the ventilation air back to the heat exchanger.

5. A method according to claim 1, wherein said flowing liquid is district heating water, which is circulated from the district heating network through the heat exchanger of the heating circuit for heating the building to the heat exchanger of the heating circuit for heating the ventilation air and therefrom back to the district heating network.

6. An apparatus for heating room space of a building, comprising heat exchanging means for conveying heat from a district heating liquid to a heating liquid flowing in heating circuits for heating the building and ventilation air, wherein, in order to obtain low temperature of the district heating liquid after said conveying, the heating circuits for heating the building and the ventilation air are connected in series, and said heating liquid flowing in the heating circuits is arranged to flow in the apparatus in such a manner that it conveys heat needed for the heating of the building and thereafter, when it is colder, heat needed for the ventilation air.

7. An apparatus according to claim 6, comprising a heat recovery circuit for conveying heat from exhaust air of the building to supply air, wherein circulation piping of the heating liquid for heating the ventilating air is connected to the heat recovery circuit in such a manner that the heating liquid circulates through a supply air heat exchanger and is removed from said circuit prior to the exhaust air heat exchanger or thereafter.

8. An apparatus according to claim 6, wherein the heating circuits for heating the building and the ventilation air have common heating liquid circulation piping, and the common heating liquid circulates from a heat exchanger heating the common liquid to the heating circuit for heating the building and thereafter to the heating circuit for heating the ventilation air.

9. An apparatus according to claim 6, wherein the heating circuits for heating the building and the ventilation air are each provided with a separate heat exchanger for heating the heating liquid in respective heating circuits, the district heating liquid being arranged to flow first through the heat exchanger of the heating circuit for heating the building and thereafter through the heat exchanger of the heating circuit for heating the ventilation air.

10. An apparatus according to claim 9, comprising a heating circuit for heating hot tap water, wherein a heat exchanger of the heating circuit for hot tap water is connected in parallel with the heat exchanger of the heating circuit for heating the ventilation air.

11. A method for heating room space of a building, comprising conveyance of heat from a district heating liquid to a heating liquid of heating circuits for heating the building and ventilation air, wherein, in order to obtain low temperature of the district heating liquid after said conveyance, said district heating liquid is arranged to flow in such a manner that it conveys heat needed for the heating of the building and thereafter heat needed for the ventilation air.

12. A method according to claim 11, comprising conveyance of heat from exhaust air of the building to supply air by means of a heat recovery circuit, wherein the heating liquid heating the ventilation air is arranged to flow through a heat exchanger in said heat recovery circuit, in which heat exchanger the liquid conveys heat to the supply air.

13. A method according to claim 12, wherein the heating liquid is removed from the heat recovery circuit prior to the heat exchanger of exhaust air or after it has passed through the heat exchanger of the exhaust air.

14. A method according to claim 11, wherein said flowing liquid is district heating water, which is circulated from the district heating network through the heat exchanger of the heating circuit for heating the building to the heat exchanger of the heating circuit for heating the ventilation air and therefrom back to the district heating network.

15. An apparatus for heating room space of a building, comprising heat exchanging means for conveying heat from a district heating liquid to a heating liquid flowing in heating circuits for heating the building and ventilation air, wherein, in order to obtain low temperature of the district heating liquid after said conveying, the heating circuits for heating the building and the ventilation air are connected in series, and said district heating liquid is arranged to flow in the apparatus in such a manner that it conveys heat needed for the heating of the building and thereafter, when it is colder, heat needed for the ventilation air.

16. An apparatus according to claim 15, comprising a heat recovery circuit for conveying heat from exhaust air of the building to supply air, wherein circulation piping of the heating liquid for heating the ventilating air is connected to the heat recovery circuit in such a manner that the heating liquid circulates through a supply air heat exchanger and is removed from said circuit prior to the exhaust air heat exchanger or thereafter.

17. An apparatus according to claim 15, wherein the heating circuits for heating the building and the ventilation air are each the heating liquid in respective heating circuits, the district heating liquid being arranged to flow first through the heat exchanger of the heating circuit for heating the building and thereafter though the heat exchanger of the heating circuit for heating the ventilation air.

* * * * *